March 10, 1931. R. PLUMMER 1,795,672
ARTICLE CARRIER
Filed March 6, 1929
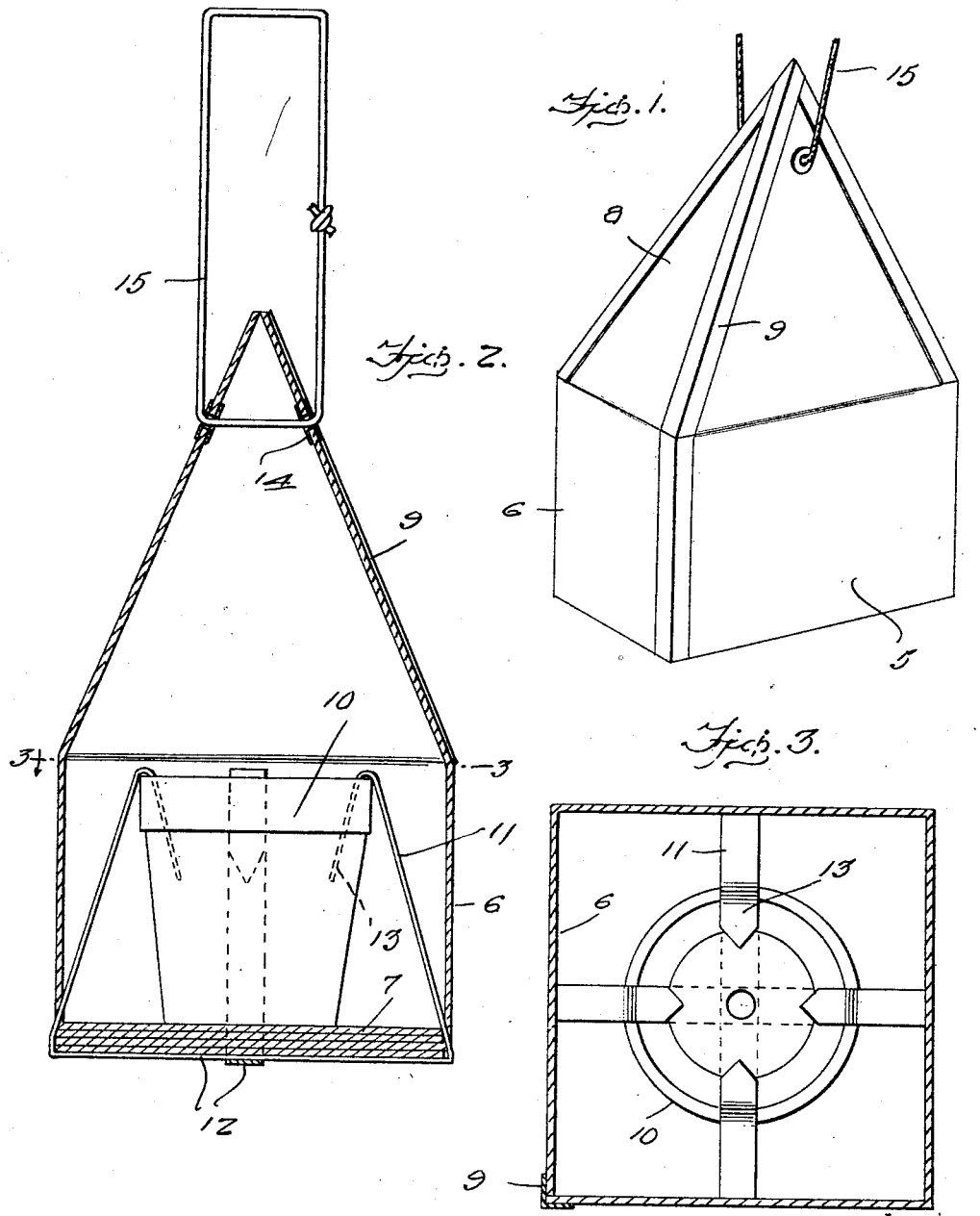
Inventor
Rebecca Plummer
By Clarence A. O'Brien
Attorney Patented Mar. 10, 1931

1,795,672

UNITED STATES PATENT OFFICE

REBECCA PLUMMER, OF PINE BLUFF, ARKANSAS

ARTICLE CARRIER

Application filed March 6, 1929. Serial No. 344,800.

The present invention relates to article carriers and is designed particularly for use in the carrying of potted plants or the like.

One of the important objects of the present invention is to provide an enclosed container within which the potted plant may be positioned and provided with anchoring means extending upwardly within the container for engaging the upper edges of the pot for securing the pot in a stationary position within the container.

A further object is to provide an article of this character of a simple and practical construction, which is strong and durable, relatively inexpensive to manufacture and otherwise well adapted for the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a perspective view of the container showing the same in closed position, Figure 2 is a vertical sectional view therethrough, and Figure 3 is a horizontal sectional view taken along the line 3—3 of Figure 2.

Referring to the drawings in detail, for the purpose of illustration I have disclosed a preferred embodiment of the invention, numeral 5 designates a container constructed preferably of substantially heavy paper, cardboard or the like and is constructed of a single sheet of material having side walls 6, the lower edges thereof extending inwardly in overlapping relation to form a plurality of thicknesses for the bottom 7 and having the upper portion of its walls pyramided as shown at 8.

The edges of the material are secured together by adhesive strips 9 or other suitable fasteners well known in the art. The added thickness of the bottom 7 of the container provides sufficient strength to support a flower pot 10 thereupon so that the plant growing in the pot will extend under the pyramided portion of the container, in a manner as will be readily understood from an inspection of Figure 2 of the drawings.

The pot 10 is secured at a central position within the container by means of anchoring members 11 which have their portions 12 positioned beneath the container and with their opposite ends inserted through openings at the bottom side edges of the walls 6 of the container and extended inwardly of the walls thereof with their upper ends formed into hooks 13 for extending over the upper edges of the pot.

The anchoring members 11 are preferably constructed of strap iron or similar relatively thin bendable metal.

Eyelets 14 are formed in a pair of the oppositely pyramided walls, adjacent the upper portion thereof in which a cord 15 or similar handle member may be inserted to facilitate the convenient carrying of the receptacle.

It will be seen from the foregoing that the article constructed in accordance with my invention forms a neat, attractive and a practical means of carrying my plant.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. An article carrier of the class described comprising an enclosed container formed of a single sheet of material and including a plurality of vertical walls with their lower ends bent inwardly in overlapping relation to form a reinforced bottom for the container, and a plurality of article anchoring members extending transversely of the bottom outwardly thereof and provided with hooked ends inserted through the walls of the container for engaging an article therein.

2. An article carrier of the class described comprising an enclosed container formed of a single sheet of material and including a plurality of vertical walls with their lower ends bent inwardly in overlapping relation to form a reinforced bottom for the container, said walls having their upper portions pyramided, a handle attached to the upper portion of the container, and a plurality of article securing members adapted for securing an article in predetermined position within the container and comprising bendable metallic straps having their intermediate portion disposed under the bottom and with their ends inserted under the lower edge of the opposite walls of the container and extended upwardly and inwardly therein and hooks formed on the upper ends of said members.

3. An article carrier of the class described comprising an enclosed container formed of wrapping material folded to provide vertical walls with their lower ends bent inwardly in overlapping relation to form a reinforced bottom for the container and a plurality of U-shaped anchoring members disposed in cross relation under the bottom of the container and having their ends inserted through the walls of the container for engaging an article therein.

In testimony whereof I affix my signature.

REBECCA PLUMMER.